US008799937B2

(12) United States Patent
Nielsen

(10) Patent No.: US 8,799,937 B2
(45) Date of Patent: *Aug. 5, 2014

(54) METHODS AND APPARATUS TO ENFORCE A POWER OFF STATE OF AN AUDIENCE MEASUREMENT DEVICE DURING SHIPPING

(75) Inventor: Christen V. Nielsen, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 304 days.

This patent is subject to a terminal disclaimer.

(21) Appl. No.: 13/403,635

(22) Filed: Feb. 23, 2012

(65) Prior Publication Data

US 2012/0159529 A1 Jun. 21, 2012

Related U.S. Application Data

(63) Continuation of application No. 12/346,430, filed on Dec. 30, 2008, now Pat. No. 8,156,517.

(51) Int. Cl.

| | |
|---|---|
| ***H04N 7/16*** | (2011.01) |
| ***H04H 60/33*** | (2008.01) |
| ***H04H 60/56*** | (2008.01) |
| ***H04H 60/32*** | (2008.01) |
| ***B65D 81/24*** | (2006.01) |
| ***B65D 5/50*** | (2006.01) |
| ***B65D 5/52*** | (2006.01) |

(52) U.S. Cl.

USPC ........ 725/18; 725/9; 725/10; 725/12; 725/19; 206/736; 206/205; 206/206

(58) Field of Classification Search

CPC ............................... H04N 21/25; H04N 21/45

See application file for complete search history.

(56) References Cited

U.S. PATENT DOCUMENTS

| | | | |
|---|---|---|---|
| 3,281,695 | A | 10/1966 | Bass |
| 3,315,160 | A | 4/1967 | Goodman |

(Continued)

FOREIGN PATENT DOCUMENTS

| | | |
|---|---|---|
| DE | 3401762 | 8/1985 |
| DE | 10247525 | 4/2004 |

(Continued)

OTHER PUBLICATIONS

European Patent Office, Extended European Search Report, for application serial No. 07777143.4, issued on Apr. 11, 2012, (7 pages).

(Continued)

*Primary Examiner* — Justin Shepard

(74) *Attorney, Agent, or Firm* — Hanley, Flight & Zimmerman, LLC

(57) ABSTRACT

Methods and apparatus to enforce a power off state of an audience measurement device during shipping of the device are disclosed herein. An example portable audience measurement device includes a housing, a media detector in the housing to collect media exposure data, and a packaging sensor to receive an audio signal. A packaging detector generates a frequency spectrum of the detected audio signal, determines an energy of a first frequency associated with the generated frequency spectrum, determines an energy of a second frequency higher than the first frequency and associated with the generated frequency spectrum, and compares the difference between the energy of the first frequency and the second frequency to a muffling threshold to determine whether the device is located within a package.

20 Claims, 6 Drawing Sheets

(56) References Cited

U.S. PATENT DOCUMENTS 3,483,327 A 12/1969 Schwartz
3,651,471 A 3/1972 Haselwood et al.
3,733,430 A 5/1973 Thompson et al.
3,803,349 A 4/1974 Watanabe
3,906,454 A 9/1975 Martin
3,947,624 A 3/1976 Miyake
4,027,332 A 5/1977 Wu et al.
4,039,943 A 8/1977 Tapscott
4,044,376 A 8/1977 Porter
4,058,829 A 11/1977 Thompson
4,245,245 A 1/1981 Matzumoto et al.
4,388,644 A 6/1983 Ishman et al.
4,546,382 A 10/1985 McKenna et al.
4,566,030 A 1/1986 Nickerson et al.
4,574,304 A 3/1986 Watanabe et al.
4,613,904 A 9/1986 Lurie
4,622,583 A 11/1986 Watanabe et al.
4,642,685 A 2/1987 Roberts et al.
4,644,393 A 2/1987 Smith et al.
4,647,964 A 3/1987 Weinblatt
4,697,209 A 9/1987 Kiewit et al.
4,723,302 A 2/1988 Fulmer et al.
4,764,808 A 8/1988 Solar
4,769,697 A 9/1988 Gilley et al.
4,779,198 A 10/1988 Lurie
4,800,437 A 1/1989 Hosoya
4,807,031 A 2/1989 Broughton et al.
4,876,736 A 10/1989 Kiewitt
4,885,632 A 12/1989 Mabey et al.
4,907,079 A 3/1990 Turner et al.
4,912,552 A 3/1990 Allison, III et al.
4,931,865 A 6/1990 Scarampi
4,943,963 A 7/1990 Waechter et al.
4,965,825 A 10/1990 Harvey et al.
4,972,503 A 11/1990 Zurlinden
5,093,921 A 3/1992 Bevins, Jr.
5,097,328 A 3/1992 Boyette
5,107,203 A 4/1992 Timko
5,136,644 A 8/1992 Audebert et al.
5,165,069 A 11/1992 Vitt et al.
5,226,177 A 7/1993 Nickerson
5,235,414 A 8/1993 Cohen
5,251,324 A 10/1993 McMullan, Jr.
5,310,222 A 5/1994 Chatwin et al.
5,319,453 A 6/1994 Copriviza et al.
5,335,277 A 8/1994 Harvey et al.
5,355,161 A 10/1994 Bird et al.
5,398,055 A 3/1995 Nonomura et al.
5,404,161 A 4/1995 Douglas et al.
5,404,172 A 4/1995 Berman et al.
5,408,258 A 4/1995 Kolessar
5,425,100 A 6/1995 Thomas et al.
5,479,408 A 12/1995 Will
5,481,294 A 1/1996 Thomas et al.
5,483,276 A 1/1996 Brooks et al.
5,488,408 A 1/1996 Maduzia et al.
5,505,901 A 4/1996 Harney et al.
5,512,933 A 4/1996 Wheatley et al.
5,550,928 A 8/1996 Lu et al.
5,659,367 A 8/1997 Yuen
5,760,760 A 6/1998 Helms
5,767,922 A 6/1998 Zabih et al.
5,771,307 A 6/1998 Lu et al.
5,801,747 A 9/1998 Bedard
5,872,588 A 2/1999 Aras et al.
5,874,724 A 2/1999 Cato
5,877,688 A 3/1999 Morinaka et al.
5,889,548 A 3/1999 Chan
5,896,554 A 4/1999 Itoh
5,963,844 A 10/1999 Dail
6,035,177 A 3/2000 Moses et al.
6,049,286 A 4/2000 Forr
6,124,877 A 9/2000 Schmidt
6,137,539 A 10/2000 Lownes et al.
6,148,081 A 11/2000 Szymanski et al.
6,177,931 B1 1/2001 Alexander et al.
6,184,918 B1 2/2001 Goldschmidt Iki et al.
6,191,690 B1 2/2001 Mukogawa
6,243,007 B1 6/2001 McLaughlin et al.
6,286,140 B1 9/2001 Ivanyi
6,297,859 B1 10/2001 George
6,298,218 B1 10/2001 Lowe et al.
6,311,214 B1 10/2001 Rhoads
6,311,837 B1 11/2001 Blaustein et al.
6,319,087 B1 11/2001 Ferrigno
6,388,662 B2 5/2002 Narui et al.
6,400,996 B1 6/2002 Hoffberg et al.
6,457,010 B1 9/2002 Eldering et al.
6,463,413 B1 10/2002 Applebaum et al.
6,467,089 B1 10/2002 Aust et al.
6,477,508 B1 11/2002 Lazar et al.
6,487,719 B1 11/2002 Itoh et al.
6,513,046 B1 1/2003 Abbott, III et al.
6,519,769 B1 2/2003 Hopple et al.
6,523,175 B1 2/2003 Chan
6,529,212 B2 3/2003 Miller et al.
6,542,878 B1 4/2003 Heckerman et al.
6,567,978 B1 5/2003 Jarrell
6,570,559 B1 5/2003 Oshima
6,574,592 B1 6/2003 Nankawa et al.
6,646,864 B2 11/2003 Richardson
6,647,212 B1 11/2003 Toriumi et al.
6,647,548 B1 11/2003 Lu et al.
6,675,383 B1 1/2004 Wheeler et al.
6,681,396 B1 1/2004 Bates et al.
6,791,472 B1 9/2004 Hoffberg
6,842,877 B2 1/2005 Robarts et al.
6,868,292 B2 3/2005 Ficco et al.
6,891,473 B2 5/2005 Maloney
6,892,880 B2 5/2005 Nieves
6,934,508 B2 8/2005 Ceresoli et al.
6,946,803 B2 9/2005 Moore
7,051,352 B1 5/2006 Schaffer
7,100,181 B2 8/2006 Srinivasan et al.
7,109,864 B2 9/2006 Maloney
7,111,317 B1 9/2006 McIntyre et al.
7,150,030 B1 12/2006 Eldering et al.
7,258,229 B2 8/2007 Chan
8,156,517 B2 4/2012 Nielsen
8,375,404 B2 2/2013 Nielsen et al.
2002/0012353 A1 1/2002 Gerszberg et al.
2002/0015112 A1 2/2002 Nagakubo et al.
2002/0026635 A1 2/2002 Wheeler et al.
2002/0056087 A1 5/2002 Berezowski et al.
2002/0057893 A1 5/2002 Wood et al.
2002/0059577 A1 5/2002 Lu et al.
2002/0072952 A1 6/2002 Hamzy et al.
2002/0077880 A1 6/2002 Gordon et al.
2002/0080286 A1 6/2002 Dagtas et al.
2002/0083435 A1 6/2002 Blasko et al.
2002/0141730 A1 10/2002 Haken
2002/0145531 A1 10/2002 Delaney
2002/0174425 A1 11/2002 Markel et al.
2002/0198762 A1 12/2002 Donato
2003/0046685 A1 3/2003 Srinivasan et al.
2003/0054757 A1 3/2003 Kolessar et al.
2003/0056215 A1 3/2003 Kanungo
2003/0067459 A1 4/2003 Lim
2003/0070183 A1 4/2003 Pierre et al.
2003/0093790 A1 5/2003 Logan et al.
2003/0101449 A1 5/2003 Bentolila et al.
2003/0103088 A1 6/2003 Dresti et al.
2003/0110485 A1 6/2003 Lu et al.
2003/0115591 A1 6/2003 Weissmueller et al.
2003/0131350 A1 7/2003 Peiffer et al.
2003/0216120 A1 11/2003 Ceresoli et al.
2004/0003394 A1 1/2004 Ramaswamy
2004/0055020 A1 3/2004 Delpuch
2004/0058675 A1 3/2004 Lu et al.
2004/0073918 A1 4/2004 Ferman et al.
2004/0088212 A1 5/2004 Hill
2004/0088721 A1 5/2004 Wheeler et al.
2004/0100437 A1 5/2004 Hunter et al.
2004/0210922 A1 10/2004 Peiffer et al.

(56) References Cited

U.S. PATENT DOCUMENTS

| | | | |
|---|---|---|---|
| 2004/0233126 | A1 | 11/2004 | Moore |
| 2005/0011423 | A1 | 1/2005 | Mercier |
| 2005/0054285 | A1 | 3/2005 | Mears et al. |
| 2005/0057550 | A1 | 3/2005 | George |
| 2005/0071639 | A1 | 3/2005 | Rodgers et al. |
| 2005/0125820 | A1 | 6/2005 | Nelson et al. |
| 2005/0138231 | A1 | 6/2005 | Yamaguchi et al. |
| 2005/0161313 | A1 | 7/2005 | Sorrentino et al. |
| 2005/0177624 | A1 | 8/2005 | Oswald et al. |
| 2005/0177745 | A1 | 8/2005 | Oswald et al. |
| 2005/0177853 | A1 | 8/2005 | Williams et al. |
| 2005/0221774 | A1 | 10/2005 | Ceresoli et al. |
| 2005/0240498 | A1 | 10/2005 | Thaler |
| 2005/0257242 | A1 | 11/2005 | Montgomery et al. |
| 2005/0285835 | A1 | 12/2005 | Jessop |
| 2005/0286860 | A1 | 12/2005 | Conklin |
| 2006/0059532 | A1 | 3/2006 | Dugan et al. |
| 2006/0069557 | A1 | 3/2006 | Barker et al. |
| 2006/0075421 | A1 | 4/2006 | Roberts et al. |
| 2006/0093998 | A1 | 5/2006 | Vertegaal |
| 2006/0143645 | A1 | 6/2006 | Vock et al. |
| 2006/0149964 | A1 | 7/2006 | Chhabra |
| 2006/0195857 | A1 | 8/2006 | Wheeler et al. |
| 2006/0212895 | A1 | 9/2006 | Johnson |
| 2006/0232575 | A1 | 10/2006 | Nielsen |
| 2006/0250217 | A1 | 11/2006 | Hamling et al. |
| 2007/0063850 | A1 | 3/2007 | Devaul et al. |
| 2007/0103312 | A1 | 5/2007 | Watanabe |
| 2007/0124615 | A1 | 5/2007 | Orr |
| 2007/0125162 | A1 | 6/2007 | Ghazi et al. |
| 2007/0152829 | A1 | 7/2007 | Lindsay et al. |
| 2007/0186228 | A1 | 8/2007 | Ramaswamy et al. |
| 2007/0192782 | A1 | 8/2007 | Ramaswamy |
| 2008/0028427 | A1 | 1/2008 | Nesvadba et al. |
| 2008/0047350 | A1 | 2/2008 | Atlas et al. |
| 2008/0060952 | A1 | 3/2008 | Negron |
| 2008/0148307 | A1 | 6/2008 | Nielsen et al. |
| 2008/0276265 | A1 | 11/2008 | Topchy et al. |
| 2008/0282817 | A1 | 11/2008 | Breed |
| 2009/0055854 | A1 | 2/2009 | Wright et al. |

FOREIGN PATENT DOCUMENTS

| | | |
|---|---|---|
| EP | 0593202 | 4/1994 |
| EP | 0946012 | 9/1999 |
| EP | 1067496 | 1/2001 |
| EP | 1318679 | 6/2003 |
| GB | 1574964 | 9/1980 |
| JP | 8331482 | 12/1996 |
| JP | 2000307520 | 11/2000 |
| WO | 9115062 | 10/1991 |
| WO | 9512278 | 5/1995 |
| WO | 9526106 | 9/1995 |
| WO | 9810539 | 3/1998 |
| WO | 9933206 | 7/1999 |
| WO | 9959275 | 11/1999 |
| WO | 0038360 | 6/2000 |
| WO | 0072484 | 11/2000 |
| WO | 0111506 | 2/2001 |
| WO | 0161892 | 8/2001 |
| WO | 0219581 | 3/2002 |
| WO | 02052759 | 7/2002 |
| WO | 03049339 | 6/2003 |
| WO | 03052552 | 6/2003 |
| WO | 03060630 | 7/2003 |
| WO | 2005032145 | 4/2005 |
| WO | 2005038625 | 4/2005 |
| WO | 2005041166 | 5/2005 |
| WO | 2005055601 | 6/2005 |
| WO | 2005065159 | 7/2005 |
| WO | 2005079457 | 9/2005 |
| WO | 2006012629 | 2/2006 |
| WO | 2007120518 | 10/2007 |
| WO | 2007136742 | 11/2007 |

OTHER PUBLICATIONS

Canadian Intellectual Property Office, Office Action, for CA Patent Application Serial No. 2,652,655; issued on Jul. 23, 2012, 4 pages.

Canadian Intellectual Property Office, Office Action issued in CA patent application 2,652,655, dated Apr. 21, 2011, 3 pages.

Mexico Intellectual Property Office, Office Action issued in MX patent application MX/a/2008/014700, Aug. 26, 2011, 2 pages.

United States Patent and Trademark Office, Non-Final Office Action, in connection with U.S. Appl. No. 11/388,262, issued on Apr. 28, 2010, (12 pages).

United States Patent and Trademark Office, Non-Final Office Action, in connection with U.S. Appl. No. 11/388,262, issued on Oct. 12, 2010, (12 pages).

United States Patent and Trademark Office, Notice of Allowances, in connection with U.S. Appl. No. 11/388,555, issued on May 20, 2010, (4 pages).

United States Patent and Trademark Office, Non-Final Office Action, in connection with U.S. Appl. No. 12/346,423, issued on Jan. 21, 2011, (13 pages).

United States Patent and Trademark Office, Non-Final Office Action, in connection with U.S. Appl. No. 12/346,416, issued on Jul. 8, 2011, (13 pages).

United States Patent and Trademark Office, Non-Final Office Action, in connection with U.S. Appl. No. 12/088,802, issued on Sep. 12, 2011, (16 pages).

United States Patent and Trademark Office, Non-Final Office Action, in connection with U.S. Appl. No. 12/346,423, issued on Jul. 5, 2011, (15 pages).

United States Patent and Trademark Office, Non-Final Office Action, in connection with U.S. Appl. No. 12/346,416, issued on Jan. 21, 2011, (17 pages).

United States Patent and Trademark Office, Final Office Action, issued in connection with U.S. Appl. No. 12/346,423, issued on Nov. 2, 2011, 18 pages.

United States Patent and Trademark Office, Final Office Action, issued in connection with U.S. Appl. No. 12/346,416, issued on Nov. 18, 2011, 15 pages.

Australian Patent and Trademark Office, Examiner's Report on AU patent application 2007254220, dated Jun. 17, 2010, 2 pages (Not included as it was previously submitted in U.S. Appl. No. 12/346,430, of which this application claims direct priority).

Chinese Patent and Trademark Office, Office Action issued for CN application 2007800228961 (with English translation), issued on Aug. 11, 2010, 6 pages. (Not included as it was previously submitted in U.S. Appl. No. 12/346,430, of which this application claims direct priority).

Liang et al., "Learning Naive Bayes Tree for Conditional Probability Estimation," Proceedings of the Canadian Al-2006 Conference, held in Quebec, Canada, pp. 456-466, on Jun. 7-9, 2006 (13 pages). (Not included as it was previously submitted in U.S. Appl. No. 12/346,430, of which this application claims direct priority).

Mozina et al., "Nomograms for Visualization of Naive Bayesian Classifier," Proceedings of the Eight European Conference on Principles and Practice of Knowledge Discovery in Databases, held in Pisa, Italy, pp. 337-348,2004 [Retrieved from the Internet on Feb. 29, 2008] (12 pages). (Not included as it was previously submitted in U.S. Appl. No. 12/346,430, of which this application claims direct priority).

"Lecture 3; Naive Bayes Classification," http://www.cs.utoronto.ca/~strider/CSCD11_ro81NaiveBayes_ZemeLpdf [Retrieved from the Internet on Feb. 29, 2008] (9 pages). (Not included as it was previously submitted in U.S. Appl. No. 12/346,430, of which this application claims direct priority).

Klein, Dan, PowerPoint Presentation of "Lecture 23: Naive Bayes," CS 188: Artificial Intelligence held on Nov. 15, 2007 (6 pages). (Not included as it was previously submitted in U.S. Appl. No. 12/346,430, of which this application claims direct priority).

"Learning Bayesian Networks: Naive and non-Naive Bayes" Oregon State University, Oregon [Retrieved from the Internet on Feb. 29, 2008]. Retrieved from the Internet: http://web.engr.oregonstate.edu/~tgd/classess/534/slides/part6.pdf (19 pages). (Not included as it was previously submitted in U.S. Appl. No. 12/346,430, of which this

(56) References Cited

OTHER PUBLICATIONS application claims direct priority).
"The Naive Bayes Classifier," CS534-Machine Learning, Oregon State University, Oregon [Retrieved from the Internet on Feb. 29, 2008]. Retrieved from the Internet: http://web.engr.oregonstate.edu/~afem/classes/cs534/notesINaivebayes-IO.pdf (19 pages). (Not included as it was previously submitted in U.S. Appl. No. 12/346,430, of which this application claims direct priority).
"Bayesian Networks," Machine Learning A, 708.064 07 Isst KU Oregon State University, Oregon [Retrieved from the Internet on Feb. 29, 2008]. Retrieved from the Internet: http://www.igi.tugraz.at.lehrelMLAIWS07/slides3.pdf (17 pages). (Not included as it was previously submitted in U.S. Appl. No. 12/346,430, of which this application claims direct priority).
"The Peltarion 81og," Jul. IO, 2006 [Retrieved from the Internet on Mar. 11, 2009] Retrieved from the Internet: http//blog.peltarion.com/2006107/1 01classifier-showdown (14 pages). (Not included as it was previously submitted in U.S. Appl. No. 12/346,430, of which this application claims direct priority).
"Logical Connective: Philosophy IO3: Introduction to Logic Conjunction, Negation, and Disjunction," [Retrieved from the Internet on 200-03-11] Retrieved from the Internet: http://philosophy.lander.edu/logiclconjunct.html (5 pages). (Not included as it was previously submitted in U.S. Appl. No. 12/346,430, of which this application claims direct priority).
"Naive Bayes Classifier," Wikipedia entry as of Mar. 11, 2009 [Retrieved from the Internet on Mar. 11, 2009] (7 pages). (Not included as it was previously submitted in U.S. Appl. No. 12/346,430, of which this application claims direct priority).
"Naive Bayes Classifier," Wikipedia entry as of Jan. 11, 2008 [Retrieved from the Internet from Wikipedia history pages on Mar. 11, 2009] (7 pages). (Not included as it was previously submitted in U.S. Appl. No. 12/346,430, of which this application claims direct priority).
Zimmerman, H., "Fuzzy set applications in pattern recognition and data-analysis," 11th IAPR International conference on Pattern Recognition, Aug. 29, 1992 (81 pages). (Not included as it was previously submitted in U.S. Appl. No. 12/346,430, of which this application claims direct priority).
Patent Cooperation Treaty, "Written Opinion of the International Searching Authority," issued by the International Searching Authority in connection with PCT application No. PCT/US2003/030355, mailed Mar. 21, 2008 (5 pages). (Not included as it was previously submitted in U.S. Appl. No. 12/346,430, of which this application claims direct priority).
Patent Cooperation Treaty, "International Search Report," issued by the International Searching Authority in connection with PCT application No. PCT/US2003/030355, mailed May 5, 2004 (6 pages). (Not included as it was previously submitted in U.S. Appl. No. 12/346,430, of which this application claims direct priority).
Patent Cooperation Treaty, "International Preliminary Examination Report," issued by the International Preliminary Examining Authority in connection with PCT application No. PCT/US2003/030370, mailed Mar. 7, 2005 (4 pages). (Not included as it was previously submitted in U.S. Appl. No. 12/346,430, of which this application claims direct priority).
Patent Cooperation Treaty, "International Search Report," issued by the International Searching Authority in connection with PCT application No. PCT/US2003/030370, mailed Mar. 11, 2004 (7 pages). (Not included as it was previously submitted in U.S. Appl. No. 12/346,430, of which this application claims direct priority).
Patent Cooperation Treaty, "Written Opinion of the International Searching Authority," issued by the International Searching Authority in connection with PCT application No. PCT/US2003/030370, mailed Nov. 15, 2004 (5 pages). (Not included as it was previously submitted in U.S. Appl. No. 12/346,430, of which this application claims direct priority).
European Patent Office, "Extended European Search Report," issued in connection with European Patent Application No. EP05798239.9, on Sep. 9, 2008 (4 pages). (Not included as it was previously submitted in U.S. Appl. No. 12/346,430, of which this application claims direct priority).
Patent Cooperation Treaty, "International Preliminary Report on Patentability," issued by the International Bureau in connection with PCT application No. PCT/US2005/028 106, mailed Apr. 5, 2007 (5 pages). (Not included as it was previously submitted in U.S. Appl. No. 12/346,430, of which this application claims direct priority).
Patent Cooperation Treaty, "International Search Report," issued by the International Searching Authority in connection with PCT application No. PCT/US2005/028106, mailed Mar. 12, 2007 (2 pages). (Not included as it was previously submitted in U.S. Appl. No. 12/346,430, of which this application claims direct priority).
Patent Cooperation Treaty, "Written Opinion of the International Searching Authority," issued by the International Searching Authority in connection with PCT application No. PCT/US2005/028106, mailed Mar. 12, 2007 (4 pages). (Not included as it was previously submitted in U.S. Appl. No. 12/346,430, of which this application claims direct priority).
Patent Cooperation Treaty, "International Search Report," issued by the International Searching Authority in connection with PCT application No. PCT/US2006/1031960, mailed Feb. 21, 2007 (2 pages). (Not included as it was previously submitted in U.S. Appl. No. 12/346,430, of which this application claims direct priority).
Patent Cooperation Treaty, "Written Opinion of the International Searching Authority," issued by the International Searching Authority in connection with PCT application No. PCT/US2006/1031960, mailed Feb. 21, 2007 (3 pages). (Not included as it was previously submitted in U.S. Appl. No. 12/346,430, of which this application claims direct priority).
Patent Cooperation Treaty, "International Preliminary Report on Patentability," issued by the International Bureau in connection with PCT application No. PCT/US2006/031960, issued Feb. 20, 2008 (4 pages). (Not included as it was previously submitted in U.S. Appl. No. 12/346,430, of which this application claims direct priority).
Patent Cooperation Treaty, "International Preliminary Report on Patentability," issued by the International Bureau in connection with PCT application No. PCT/US2007/011894, on Nov. 18, 2008 (8 pages). (Not included as it was previously submitted in U.S. Appl. No. 12/346,430, of which this application claims direct priority).
Patent Cooperation Treaty, "International Search Report," issued by the International Searching Authority in connection with PCT application No. PCT/US2007/011894, mailed Mar. 19, 2008 (4 pages). (Not included as it was previously submitted in U.S. Appl. No. 12/346,430, of which this application claims direct priority).
Patent Cooperation Treaty, "Written Opinion," issued by the International Searching Authority in connection with PCT application No. PCT/US2007/011894, mailed Mar. 19, 2008 (7 pages). (Not included as it was previously submitted in U.S. Appl. No. 12/346,430, of which this application claims direct priority).
Non-Final Office Action issued by the United States Patent and Trademark Office on Feb. 5, 2009, in connection with U.S. Appl. No. 11/576,328 (20 pages).
United States Patent and Trademark Office, "Non-Final Office Action," issued in connection with U.S. Appl. No. 11/576,328, on Aug. 7, 2009 (11 pages).
United States Patent and Trademark Office, "Notice of Allowance," issued in connection with U.S. Appl. No. 11/576,328, on Apr. 7, 2010 (8 pages).
United States Patent and Trademark Office, "Non-Final Office Action," issued in connection with U.S. Appl. No. 11/388,262, on Mar. 5, 2009 (10 pages).
United States Patent and Trademark Office, "Final Office Action," issued in connection with U.S. Appl. No. 11/388,262, on Sep. 2, 2009 (13 pages).
United States Patent and Trademark Office, "Advisory Action," issued in connection with U.S. Appl. No. 11/388,262, on Jan. 7, 2010 (3 pages).
Non-Final Office Action issued by the United States Patent and Trademark Office on Dec. 27, 2007, in connection with U.S. Appl. No. 11/388,555 (12 pages).

(56) References Cited

OTHER PUBLICATIONS

Final Office Action issued by the United States Patent and Trademark Office on Oct. 6, 2008, in connection with U.S. Appl. No. 11/388,555 (18 pages).
Advisory Action issued by the United States Patent and Trademark Office on Jan. 13, 2009, in connection with U.S. Appl. No. 11/388,555 (4 pages).
United States Patent and Trademark Office, "Non-Final Office Action," issued in connection with U.S. Appl. No. 11/388,555, on Mar. 31, 2009 (10 pages).
United States Patent and Trademark Office, "Final Office Action," issued in connection with U.S. Appl. No. 11/388,555, on Dec. 8, 2009 (12 pages).
United States Patent and Trademark Office, "Advisory Action," issued in connection with U.S. Appl. No. 11/388,555, on Mar. 22, 2010 (3 pages).
United States Patent and Trademark Office, "Non-Final Office Action," issued in connection with U.S. Appl. No. 11/672,706, on Jul. 23, 2009 (8 pages).
United States Patent and Trademark Office, "Notice of Allowance," issued in connection with U.S. Appl. No. 11/672,706, on Dec. 31, 2009 (6 pages).
Thomas, William L., "Television Audience Research Technology, Today's Systems and Tomorrow's Challenges," Nielsen Media Research, Jun. 5, 1992 (4 pages).
Vincent et al., "A Tentative Typology of Audio Source Separation Tasks," 4tn International Symposium on Independent Component Analysis and Blind Signal Separation (ICA 2003), held in Nara, Japan, Apr. 2003 (6 pages). (Not included as it was previously submitted in U.S. Appl. No. 12/346,430, of which this application claims direct priority).
Smith, Leslie S., "Using IIDs to Estimate Sound Source Direction," Proceedings of the Seventh International Conference on Simulation of Adaptive Behavior on from Animals to Animats, pp. 60-61, 2002 (2 pages). (Not included as it was previously submitted in U.S. Appl. No. 12/346,430, of which this application claims direct priority).
Dai et al., "Transferring Naive Bayes Classifiers for Text Classification," Proceedings of the Twenty-Second AAAI Conference on Artificial Intelligence, held in Vancouver, British Columbia on Jul. 22-26, 2007 (6 pages). (Not included as it was previously submitted in U.S. Appl. No. 12/346,430, of which this application claims direct priority).
Elkan, Charles, "Naive Bayesian Learning," Adapted from Technical Report No. CS97-557, Department of Computer Science and Engineering, University of California, San Diego, U.S.A., Sep. 1997 (4 pages). (Not included as it was previously submitted in U.S. Appl. No. 12/346,430, of which this application claims direct priority).
Zhang, Harry, "The Optimality ofNaive Bayes," Proceedings of the Seventeenth International FLAIRS Conference, 2004 (6 pages). (Not included as it was previously submitted in U.S. Appl. No. 12/346,430, of which this application claims direct priority).
Domingos et al., "On the Optimality of the Simple Bayesian Classifier under Zero-One Loss," Machine Learning, vol. 29, No. 2, pp. 103-130, Nov. 1, 1997 (28 pages). (Not included as it was previously submitted in U.S. Appl. No. 12/346,430, of which this application claims direct priority).
Patron-Perez et al., "A Probabilistic Framework for Recognizing Similar Actions using Spatio-Temporal Features," BMVC07, 2007 [Retrieved from the Internet on Feb. 29, 2008] (10 pages). (Not included as it was previously submitted in U.S. Appl. No. 12/346,430, of which this application claims direct priority).
Mitchell, Tom M., "Chapter 1; Generative and Discriminative Classifiers: Naive Bayes and Logistic Regression," Machine Learning, Sep. 21, 2006 (17 pages). (Not included as it was previously submitted in U.S. Appl. No. 12/346,430, of which this application claims direct priority).
Lang, Marcus, "Implementation on Naive Bayesian Classifiers in Java," http://www.iit.edu/~ipro356ro3/ipro/documents/naive-bayes.edu[Retrieved from the Internet on 2008-02-291 (4 pages). (Not included as it was previously submitted in U.S. Appl. No. 12/346,430, of which this application claims direct priority).
Australian Government, IP Australia, Notice of Acceptance, issued in connection with application serial No. 2007254220, issued Mar. 14, 2012, 3 pages.
The State Intellectual Property Office of China, Office Action, issued in connection with CN application serial No. 200780022896.1, issued on Jan. 29, 2012, English Translation, 1 page.
Office action issued by the United States Patent and Trademark Office on Aug. 10, 2012, in connection with U.S. Appl. No. 12/346,423 (20 pages).
United States Patent and Trademark Office, "Notice of Allowance," issued in connection with U.S. Appl. No. 12/346,430 on Feb. 23, 2012 (6 pages).
United States Patent and Trademark Office, "Notice of Allowance," issued in connection with U.S. Appl. No. 12/346,430 on Nov. 23, 2012 (8 pages).
United States Patent and Trademark Office, "Office Action," issued in connection with U.S. Appl. No. 12/346,430 on Mar. 14, 2011 (23 pages).
United States Patent and Trademark Office, "Office Action," issued in connection with U.S. Appl. No. 12/346,423 on Feb. 8, 2013 (20 pages).
United States Patent and Trademark Office, "Notice of Allowance," issued in connection with U.S. Appl. No. 12/346,416 on Nov. 2, 2012 (8 pages).
United States Patent and Trademark Office, "Notice of Allowance," issued in connection with U.S. Appl. No. 12/088,802 on Aug. 1, 2012 (20 pages).
The State Intellectual Property Office of China, "3rd Office action," issued in connection with application serial No. 200780022896.1 on Dec. 4, 2012 (5 pages).
State Intellectual Property Office of China, "4th Office Action," issued in connection with Application No. 200780022896.1, May 30, 2013, 16 pages.
State Intellectual Property Office of China, "Search Report," issued in connection with Application No. 200780022896.1, May 30, 2013, 3 pages.
Canadian Patent Office, "Office Action," issued in connection with Application No. 2,652,655, Dec. 19, 2013, 5 pages.

METHODS AND APPARATUS TO ENFORCE A POWER OFF STATE OF AN AUDIENCE MEASUREMENT DEVICE DURING SHIPPING

CROSS REFERENCE TO RELATED APPLICATIONS

This patent arises from a continuation of U.S. patent application Ser. No. 12/346,430, filed on Dec. 30, 2008, now U.S. Pat. No. 8,156,517, which is hereby incorporated by reference in its entirety.

FIELD OF THE DISCLOSURE

The present disclosure relates generally to audience measurement and, more particularly, to methods and apparatus to enforce a power off state of an audience measurement device during shipping of the device.

BACKGROUND

Media-centric companies are often interested in tracking the number of times that audience members are exposed to various media compositions (e.g., television programs, motion pictures, internet videos, radio programs, etc.). In some instance, to track such exposures, companies generate audio and/or video signatures of media compositions (e.g., a representation of some, preferably unique, portion of the media composition or the signal used to transport the media composition) that can be used to determine when those media compositions are presented to audience members. The media compositions may be identified by comparing the signature to a database of reference signatures. Additionally or alternatively, companies transmit identification codes (e.g., watermarks) with media compositions to monitor presentations of those media compositions to audience members by comparing identification codes retrieved from media compositions presented to audience members with reference identification codes stored in a reference database. Like the reference signature, the reference codes are stored in association with information descriptive of the corresponding media compositions to enable identification of the media compositions.

Media ratings and metering information are typically generated by collecting media exposure information from a group of statistically selected households. Each of the statistically selected households typically has a data logging and processing unit such as, for example, a stationary or portable media measurement device, commonly referred to as a "metering device" or "meter." The meter typically includes sensors to gather data from the monitored media presentation devices (e.g., audio-video (AV) devices) at the selected site and deliver the gathered data to a centralized location for processing.

DETAILED DESCRIPTION

Figure 1:
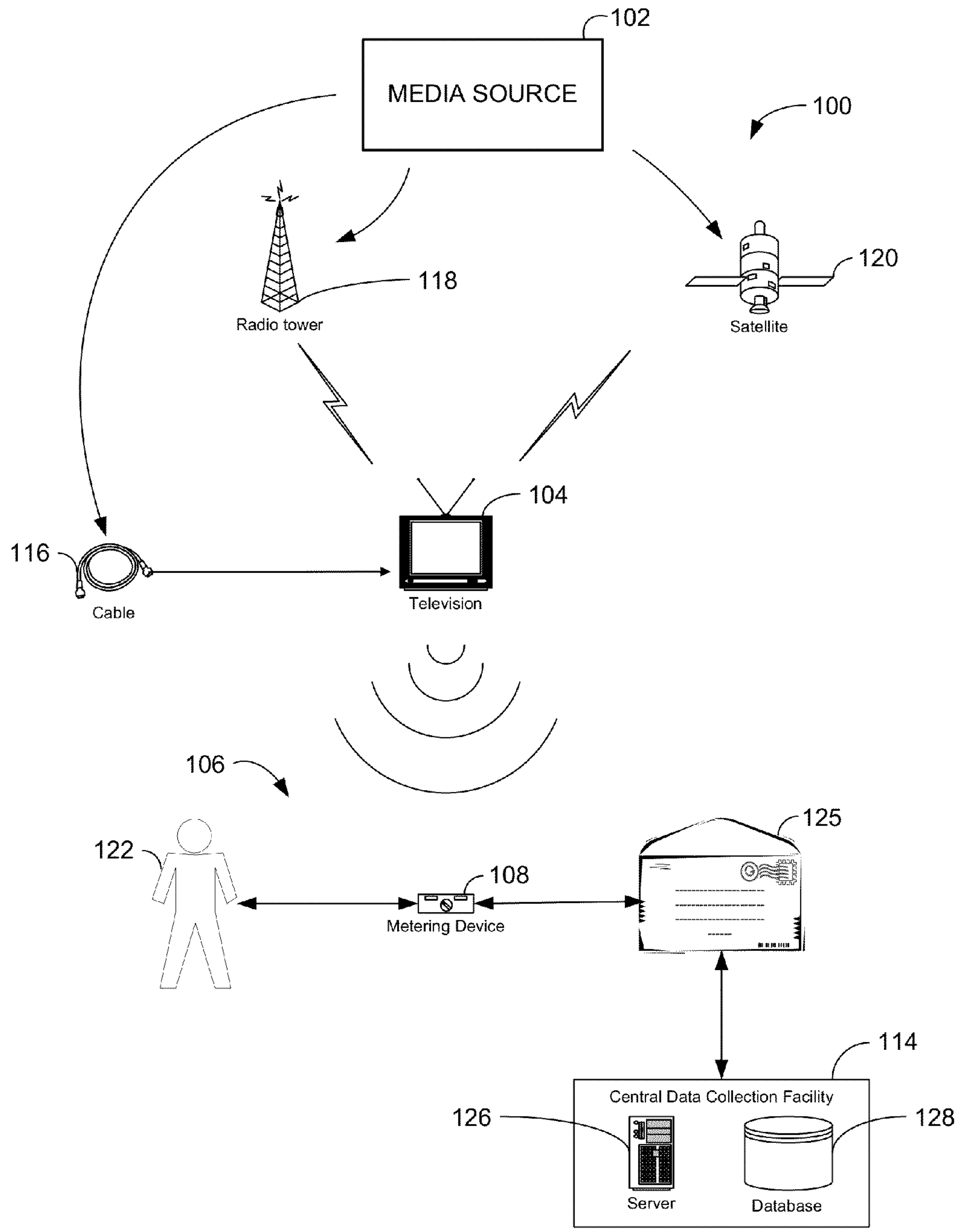
FIG. 1 is a block diagram of an example media exposure measurement system.

Although the following discloses example methods, apparatus, systems, and articles of manufacture including, among other components, firmware and/or software executed on hardware, it should be noted that such methods, apparatus, systems, and articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

The example methods, apparatus, systems, and articles of manufacture described herein can be used to power on and/or power off a metering device such as, for example, a stationary or a portable media measurement device. To collect media exposure information, the metering device is configured to generate, detect, decode, and/or, more generally, collect media identifying data (e.g., audio codes, video codes, audio signatures, video signatures, etc.) associated with media presentations to which the portable meter is exposed.

The media exposure data is collected by the meter and forwarded to a central facility where it is used to statistically determine the size and/or demographics of audiences exposed to media presentations. The process of enlisting and retaining the panel participants ("panelists") can be a difficult and costly aspect of the audience measurement process. For example, panelists must be carefully selected and screened for particular demographic characteristics so that the panel is representative of the population(s) of interest. In addition, installing traditional audience measurement devices in panelist's residences has been expensive and time consuming. Thus, it is advantageous to create a meter that is less costly and can be installed easily by a panelist to make participation easier.

In the example meter described herein, a mailable metering device collects audio codes and/or signatures and stores them into memory for the limited time frame the meter is in the panelist's home. The meter is assembled and activated at a first location, and is mailed to the panelist who installs the meter by, for example, placing it near a media presentation device (e.g., a television) to be monitored. The meter collects data regarding the media presentations exposed to the meter for a time frame (e.g., one month). Once the time frame expires, the meter is placed into return packaging by the panelist and mailed to a collection center (e.g., a central facility) for data extraction. The example metering device is active (e.g., is at least partially powered "on") at the time of configuration (pre-shipping) and is in a stand-by mode during shipping. An internal clock initiates a "wake-up" at a specific time to begin metering (e.g., to collect data regarding media exposure). At the end of the metering period (e.g., when the memory is full, the time period expires, etc.), the device generates a "mail me back" reminder. The meter goes back into the stand-by mode when packaged for mailing to the central facility and remain in that mode until the data is extracted at the central facility.

Some mail carriers, however, do not allow items to be shipped with batteries installed therein. This prohibition against battery usage during shipment eliminates the ability to ship a metering device that is at least partially powered on. Other carriers allow a device to be shipped with batteries installed as long as the batteries are installed inside the device, and the device is powered "off." These carriers define "off" as all circuits being inactive except for real-time clocks and memory keep-alive circuits. To address this problem, the meters disclosed herein automatically power on or power off by detecting when in response to the meters location in or out of a shipping container.

The example methods, apparatus, systems, and articles of manufacture described herein determine whether the metering device is located within a mailer, or other shipping container, by determining low energy in ambient audio. In particular, when the metering device is placed in a mailer, it will experience a muffling effect due to the packaging. Depending upon the type of packaging used, the muffling effect may vary anywhere between being very pronounced and being rather subtle.

In some examples, whether or not the device is located within a mailer is determined by first generating a frequency spectrum of ambient audio, determining the energy associated with the detected ambient audio at a particular frequency band, and comparing the energy of the detected ambient audio at the particular frequency band to a muffling threshold. If the energy of the detected ambient audio is greater than the muffling threshold, the meter is not within packaging. If the energy of the detected ambient audio is less than the muffling threshold, the meter is within packaging.

In other examples, determination of whether or not the device is located within a mailer is determined by collecting ambient audio over a time frame (e.g., 15 minutes) and determining the energy in at least two frequency bands of interest, such as, for example, 600 Hz and 2400 Hz. In some example, the determined energy may be a maximum energy. Outlying maximums may be discarded as likely due to a percussive event (e.g., a door slamming). The maximum energy associated with the lower frequency band is then compared to a "silent" threshold to ensure that an evaluation isn't made if there is not enough audio (i.e., the ambient noise is silent). Additionally, an evaluation is not made if there isn't enough audio in the higher frequency band, and thus the difference between the energy at the lower frequency band and the higher frequency band is compared to an "absent" threshold. If there is not enough audio (i.e., the ambient noise is silent) or there is not enough audio in the higher frequency band (i.e., there is not enough higher frequency data), no evaluation will take place, and the meter will continue to collect ambient audio over another period of time. When, on the other hand, there is enough audio in the lower and higher frequency bands, the difference between the energy at the lower frequency band and the higher frequency band is compared to a muffling threshold to determine the meter location. If the difference in energy of the detected ambient audio is greater than the muffling threshold, the meter is within packaging. Otherwise, if the difference in energy of the detected ambient audio is less than the muffling threshold, the meter is not within packaging. By utilizing any example determination method, the determined meter location can be used to power off the device when the device is determined to be within packaging, thereby ensuring compliance with the regulations of shipping and/or courier services.

In the example of FIG. 1, an example media presentation system 100 including a media source 102 and a media presentation device 104 is metered using an example media measurement system 106. The example media measurement system 106 includes a "mailable" metering device 108 and a central facility 114. The metering device 108 is "mailable" in the sense that its size (e.g., form) enables it to be shipped via a commercial carrier such as, for example, the United States Postal Service ("USPS"), United Parcel Service ("UPS"), FedEx, DHL, and/or other suitable postal service. The media presentation device 104 is configured to receive media from the media source 102 via any of a plurality of transmission systems including, for example, a cable service provider 116, a radio frequency (RF) service provider 118, a satellite service provider 120, an Internet service provider (ISP) (not shown), or via any other analog and/or digital broadcast network, multicast network, and/or unicast network. Further, although the example media presentation device 104 of FIG. 1 is shown as a television, the example media measurement system 106 is capable of collecting information from any type of media presentation device including, for example, a personal computer, a laptop computer, a radio, a cinematic projector, an MP3 player, or any other audio and/or video presentation device or system.

The metering device 108 of the illustrated example is disposed on or near the media presentation device 104 and may be adapted to perform one or more of a plurality of metering methods (e.g., channel detection, collecting signatures and/or codes, etc.) to collect data concerning the media exposure of the metering device 108, and thus, the media exposure of one or more panelist(s) 122. Depending on the type(s) of metering that the metering device 108 is adapted to perform, the metering device 108 may be physically coupled to the presentation device 104 or may instead be configured to capture signals emitted externally by the presentation device 104 such that direct physical coupling to the presentation device 104 is not required. For instance, in this example, the metering device 108 is not physically or electronically coupled to the monitored presentation device 104. Instead, the metering device 108 is provided with at least one audio sensor, such as, for example, a microphone, to capture audio data regarding in-home media exposure for the panelist 122 and/or a group of household members. Similarly, the example metering device 108 is configured to perform one or more of a plurality of metering methods (e.g., collecting signatures and/or codes) on the collected audio to enable identification of the media to which the panelist(s) 122 carrying and/or proximate to the device 108 are exposed.

In the example of FIG. 1, the metering device 108 is adapted to be mailed to and/or from the remotely located central data collection facility 114 within a shipping container 125 such as, for example, an envelope or a package, via a package delivery service 124. The example central data collection facility 114 includes a server 126 and a database 128 to process and/or store data received from the metering device 108 and/or other metering device(s) (not shown) used to measure other panelists. In another example, multiple servers and/or databases may be employed as desired. The package delivery service may be any suitable package delivery service including, for example, the United States Postal Service ("USPS"), United Parcel Service ("UPS"), FedEx, DHL, etc. It will be appreciated that the shipping address of the facility that receives the meter 108 may be separately located from the central data collection facility 114, and that the central data collection facility 114 may be communicatively coupled to the meter collection facility via any suitable data transfer network and/or method.

Figure 2:
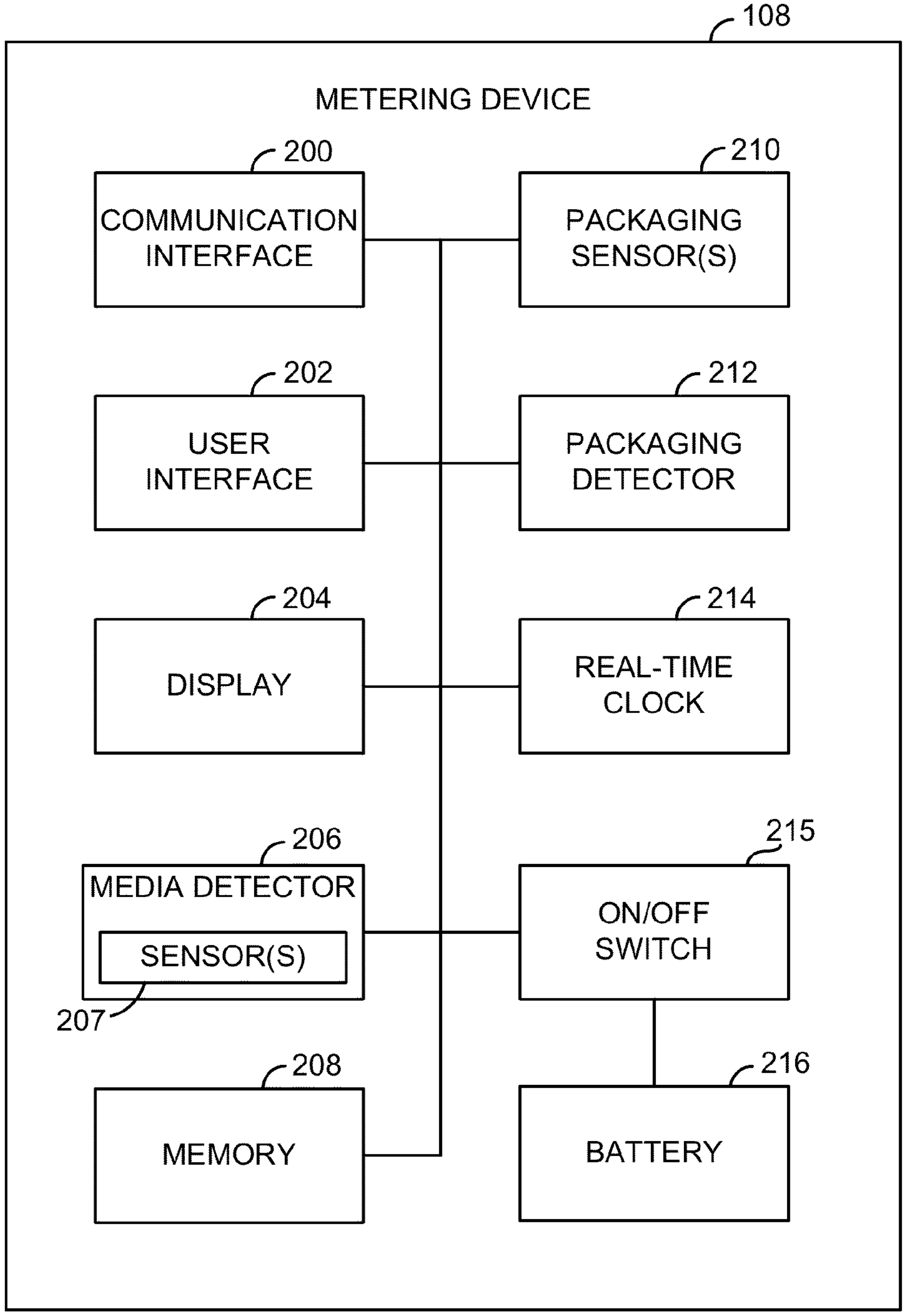
FIG. 2 is a block diagram of an example apparatus that may be used to implement the example metering device of FIG. 1.

FIG. 2 is a block diagram of an example apparatus that may be used to implement the example metering device 108 of FIG. 1. In the illustrated example of FIG. 2, the example metering device 108 includes a communication interface 200, a user interface 202, a display 204, a media detector 206, a memory 208, a packaging sensor(s) 210, a packaging detector 212, a real-time clock 214, and a power supply, such as for example a battery 216. While an example manner of implementing the metering device 108 of FIG. 1 has been illustrated in FIG. 2, one or more of the elements, processes and/or devices illustrated in FIG. 2 may be combined, divided, re-arranged, omitted, eliminated and/or implemented in any other way. Further, each of the example communication interface 200, the user interface 202, the example display 204, the example media detector 206, the example memory 208, the example packaging sensor(s) 210, the example packaging detector 212, the example real-time clock 214, and/or, more generally, the example metering device 108 may be implemented by hardware, software, firmware and/or any combination of hardware, software and/or firmware. Thus, for example, any of the example communication interface 200, the user interface 202, the example display 204, the example media detector 206, the example memory 208, the example packaging sensor(s) 210, the example packaging detector 212, the example real-time clock 214, and/or, more generally, the metering devices 108 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example communication interface 200, the user interface 202, the example display 204, the example media detector 206, the example memory 208, the example packaging sensor(s) 210, the example packaging detector 212, the example real-time clock 214, and/or, more generally, the example metering device 108 are hereby expressly defined to include a tangible, computer-readable medium such as a memory, DVD, CD, etc. storing the software and/or firmware. Further still, the example metering device 108 may include one or more elements, processes and/or devices in addition to, or instead of, those illustrated in FIG. 2, and/or may include more than one of any or all of the illustrated elements, processes and devices.

The communication interface 200 of the illustrated example enables the metering device 108 to convey and/or receive data to and/or from the other components of the media exposure measurement system 106. For example, the example communication interface 200 enables communication between the metering device 108 and the meter collection facility and/or central facility 114 after the metering device 108 is delivered to the meter collection facility and/or central facility 114. The communication interface 200 of FIG. 2 is implemented by, for example, an Ethernet card, a digital subscriber line, a coaxial cable, and/or any other wired and/or wireless connection.

The user interface 202 of the illustrated example may be used by the panelist 122 or other user to enter data, such as, for example, identity information associated with the panelist 122 or other subject and/or demographic data such as age, race, sex, household income, etc. and/or commands into the metering device 108. Entered data and/or commands are stored, for example, in the memory 208 (e.g., memory 524 and/or memory 525 of the example processor system 510 of FIG. 5) and may be subsequently transferred to the central facility 114. The example user interface 202 is implemented by, for example, button(s), a keyboard, a mouse, a track pad, a track ball, a voice recognition system, and/or any other suitable interface.

The example display 204 of FIG. 2 is implemented using, for example, a light emitting diode (LED) display, a liquid crystal display (LCD), and/or any other suitable display configured to present visual information. In some examples, the display 204 conveys information associated with status information, such as, for example, whether the metering device is powered on or powered off, and/or mailing reminders. The example display 204, however, may be configured to display any desired visual information. Although the display 204 and the user interface 202 are shown as separate components in the example of FIG. 2, the display 204 and the user interface 202 may instead be integrated into a single component such as, for example, a touch-sensitive screen configured to enable interaction between the panelist 122 and the metering device 108.

The example media detector 206 of FIG. 2 includes one or more sensors 207, such as, for instance an optical and/or audio sensor configured to detect particular aspects of media to which the metering device 108 is exposed. For example, the media detector 206 may be capable of collecting signatures and/or detecting codes (e.g., watermarks) associated with media content to which it is exposed from audio signals emitted by an information presentation device. Data gathered by the media detector 206 is stored in the memory 208 and later used (e.g., at the central facility) to identify the media to which the metering device 108 is being exposed. The precise methods to collect media identifying information are irrelevant, as any methodology to collect audience measurement data may be employed without departing from the scope or spirit of this disclosure.

The example packaging sensor(s) 210 of FIG. 2 collect information to enable the determination of whether the metering device 108 is within a package 125 (i.e., to determine "packaging status"). For instance, in some examples described in detail below, the packaging sensor(s) 210 detect the frequency spectrum of ambient noise or audio associated with the environment surrounding the metering device 108.

In the illustrated example, the packaging sensor(s) 210 are periodically or non-periodically activated to take a desired reading after the expiration of a period of time. For example, the packaging sensor(s) 210 may collect data essentially continuously for a 15 minute time frame. The period of time between readings may be different for different applications.

The data from the packaging sensor(s) 210 is conveyed to the packaging detector 212 which gathers the detected data and compares the received data with relevant standards and/or thresholds to determine whether the metering device 108 is within the package 125. Example implementations of the determination process are described in further detail below.

When the packaging detector 212 determines that the metering device 108 is housed within a package 125, the packaging detector 212 causes the metering device 108 to power off and/or continues to hold the device in the powered off state. While in some instances, the power off command may completely shut down power to all elements of the metering device 108, in this example, a power off command includes a powering down of all elements except for the example real-time clock 214 and the memory 208. In other words, when the metering device 108 is powered down, an electrical connection is maintained between the memory 208 and the battery 216 to enable the storage of information in the memory 208.

If the example packaging detector 212 determines that the metering device 108 is not located within a package 125, the metering device 108 may be powered on if necessary. For instance, when the metering device 108 is received by the panelist 122 and removed from the package 125, the packaging detector 210 may determine that the metering device 108 is not within a package 125 and may power on the metering device, and prepare the metering device 108 for recording data. In other examples, the metering device 108 is powered on at a predetermined time (i.e., a "wake-up" time) stored in the real-time clock 214 or stored in the memory 208 and based on a comparison to the time of the real-time clock 214. Still further, the metering device 108 may include a switch 215 that may be depressed, moved, or otherwise activated by the panelist 122 or other user to power on the device 108. The inclusion of the packaging sensor(s) 210 and the packaging detector 212 is advantageous over when a power off switch is present to ensure the device is off when shipped even if the panelist or manufacturer fails to turn off the device prior to shipping.

The elements of the metering device 108 that receive power during either power off or power on modes may vary as desired. For example, during the power off mode the battery 216 may supply power to any desired subset of the example communication interface 200, user interface 202, display 204, media detector 206, memory 208, packaging sensor(s) 210, packaging detector 212, real-time clock 216, and/or any other element. However, the subset is preferably selected to comply with applicable shipping regulations.

The packaging sensor(s) 210 of the illustrated example are implemented using, for example, an audio sensor. However, other type(s) of sensor(s) such as, for example, microphone(s), IR sensor(s), RF sensor(s), optical sensor(s), magnetic sensor(s), and/or any other combination or type of sensor capable of detecting whether the metering device is within the package 125 may be employed.

Figure 2B:
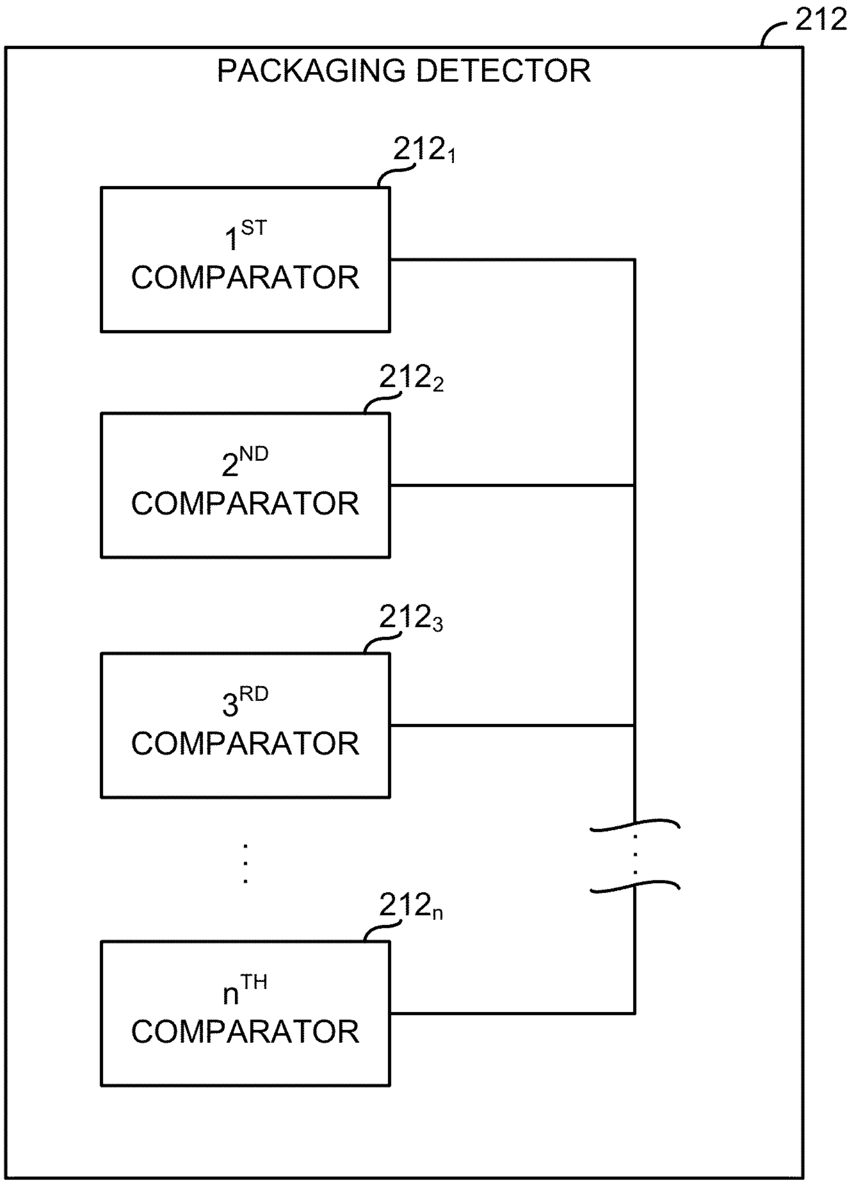
FIG. 2B is a block diagram of an example packaging detector that may be used to implement the example packaging detector of FIG. 2.

Turning to FIG. 2B, the example packaging detector 212 may include one or any number of separate comparators $\mathbf{212}_1$, $\mathbf{212}_2$, $\mathbf{212}_3$, . . . $\mathbf{212}_n$. Each of the comparators $\mathbf{212}_1$, $\mathbf{212}_2$, $\mathbf{212}_3$, . . . $\mathbf{212}_n$ may be utilized in series, in parallel, and/or in any combination thereof to determine whether or not the metering device 108 is located within the package 125. For instance, in some examples, a first comparator $\mathbf{212}_1$ may be used to compare a first frequency to a first threshold to determine whether there is enough data in the detected audio signal to accurately predict whether the metering device 108 is within the package 125. Similarly, a second comparator $\mathbf{212}_2$ compares the difference between the energy of the first frequency and a second, higher frequency to a threshold to determine whether there is enough data in the second frequency to accurately predict whether the metering device 108 is within the package 125. Finally, in some example, a third comparator $\mathbf{212}_3$, compares the difference between the energy of the first frequency and the second frequency to another threshold to determine whether the audio signal is muffled, and thus, whether the metering device 108 is within the package 125.

Figure 3:
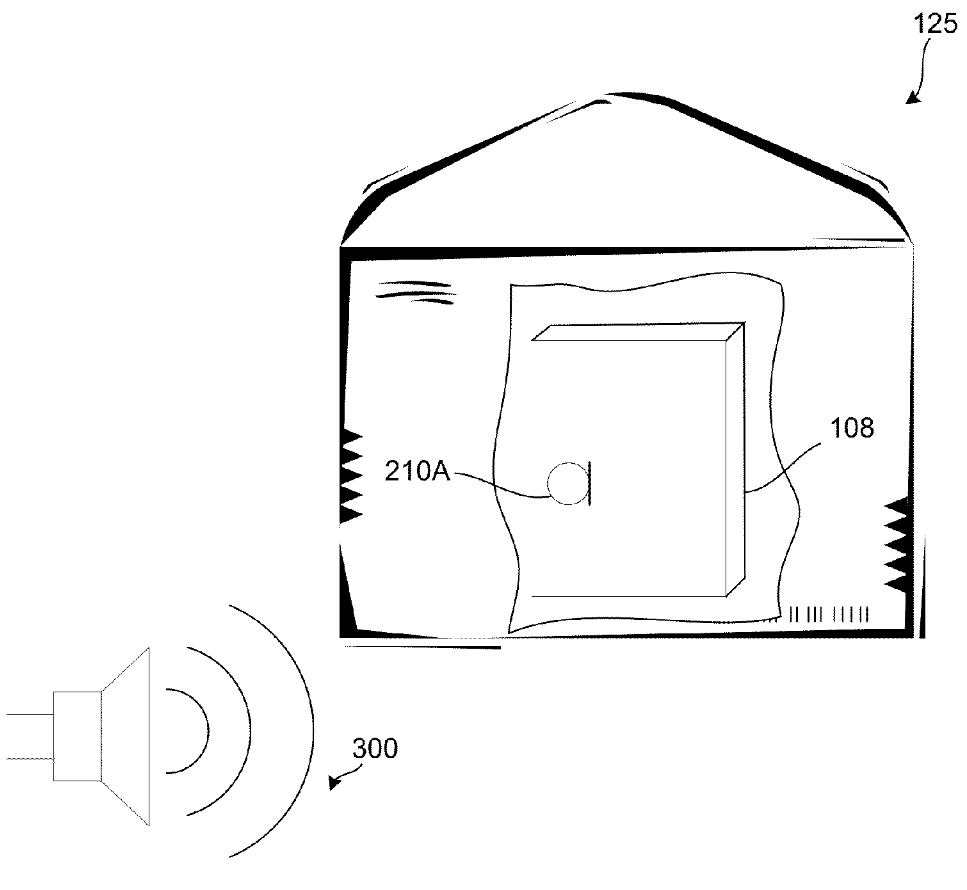
FIG. 3 illustrates an example implementation of the example metering device of FIG. 2 located in an example package.

FIG. 3 illustrates an example implementation of the example metering device 108 of FIG. 2 located within an example package 125. In the illustrated example, the packaging sensor 210 is implemented by an audio sensor 210A, such as, for example, a microphone that is adapted to detect ambient noise 300. The ambient noise 300 may be any noise. For example, the ambient noise 300 may be composed of sounds from sources both near and distant including, for instance, noise associated with the operation of the media presentation device 104 and/or noise associated with shipping or transportation of the package (e.g., engine noise, airplane noise, package noise, etc.). As noted above, the metering device 108 is insertable into the package 125. The package 125 may be constructed of paper, cardboard, plastic, and/or any other suitable packaging material. When the metering device 108 is inserted into the package 125, and the package is closed, the ambient noise 300 detected by the audio sensor 210A experiences a "muffling" effect. In other words, the energy of certain frequencies of the ambient noise 300 is reduced, depending upon the acoustic characteristics of the package 125. For example, the energy of the higher frequencies of the ambient noise 300 may be reduced by the package 125. Additionally, the package 125 may include internal packaging material, such as, for example, loosefill peanuts, encapsulated-air plastic sheeting, polyethylene foam sheeting, inflatable packaging, kraft paper, paper cushioning, and/or other suitable internal packaging, which may further acoustically muffle the ambient sound 300.

As a result, when the metering device 108 is inserted into the package 125, the sound level detected by the audio sensor 210A is quieted, at least at certain frequencies. Accordingly, regardless of the orientation of the audio sensor 210A within the package 125, the detected ambient noise 300 will experience some detectable muffling effect that may be used to determine that the metering device 108 is located within the package 125.

As described above in connection with FIG. 2, the signals generated by the audio sensor 210A are conveyed to the packaging detector 212. In the illustrated example the packaging detector 212 compares the energy levels of the ambient noise 300 with various thresholds as described below. The thresholds may have been taken by the same packaging sensor(s) 210 or otherwise set in memory 208. For example, the thresholds may be determined by previous samples, a statistical analysis of multiple samples, a specific reading, and/or any other determination method. In a given cycle, when the measured value of the ambient noise 300 is captured, the packaging detector 212 compares the results of the measured energy level of two particular frequencies with a first threshold (e.g., a "silent" threshold") and a second threshold (e.g., an "absent" threshold") to determined whether the captured ambient noise 300 contains sufficient data to make a determination of whether the package is within the package 125. In particular, a determination of whether the device 108 is within the package 125 will not be accurate if the determination is conducted when the device 108 is in a "silent" room, or when there is insufficient data in the higher frequency band to provide an accurate depiction of muffled ambient noise. If, however, the data is sufficient to make an evaluation of whether the device 108 is within the package 125, the difference between the energy associated with a higher frequency and the energy associated with a lower frequency is compared to a third threshold (e.g., a "muffling" threshold). By comparing the difference between the frequencies to a "muffling" threshold, the packaging detector 212 can determine that the, the meter 108 is located within the package 125. As described above, if the packaging detector 212 determines that the metering device 108 is within the package 125, the packaging detector 108 will power off the metering device 108. Any desired frequency can be used to make the packaging state determination. In the illustrated example, the lower frequency is approximately 600 Hz and the higher frequency is approximately 2400 Hz, but other frequencies would likely be appropriate. In addition, more or less than two frequencies and/or more or less than three thresholds may be employed.

Figure 4:
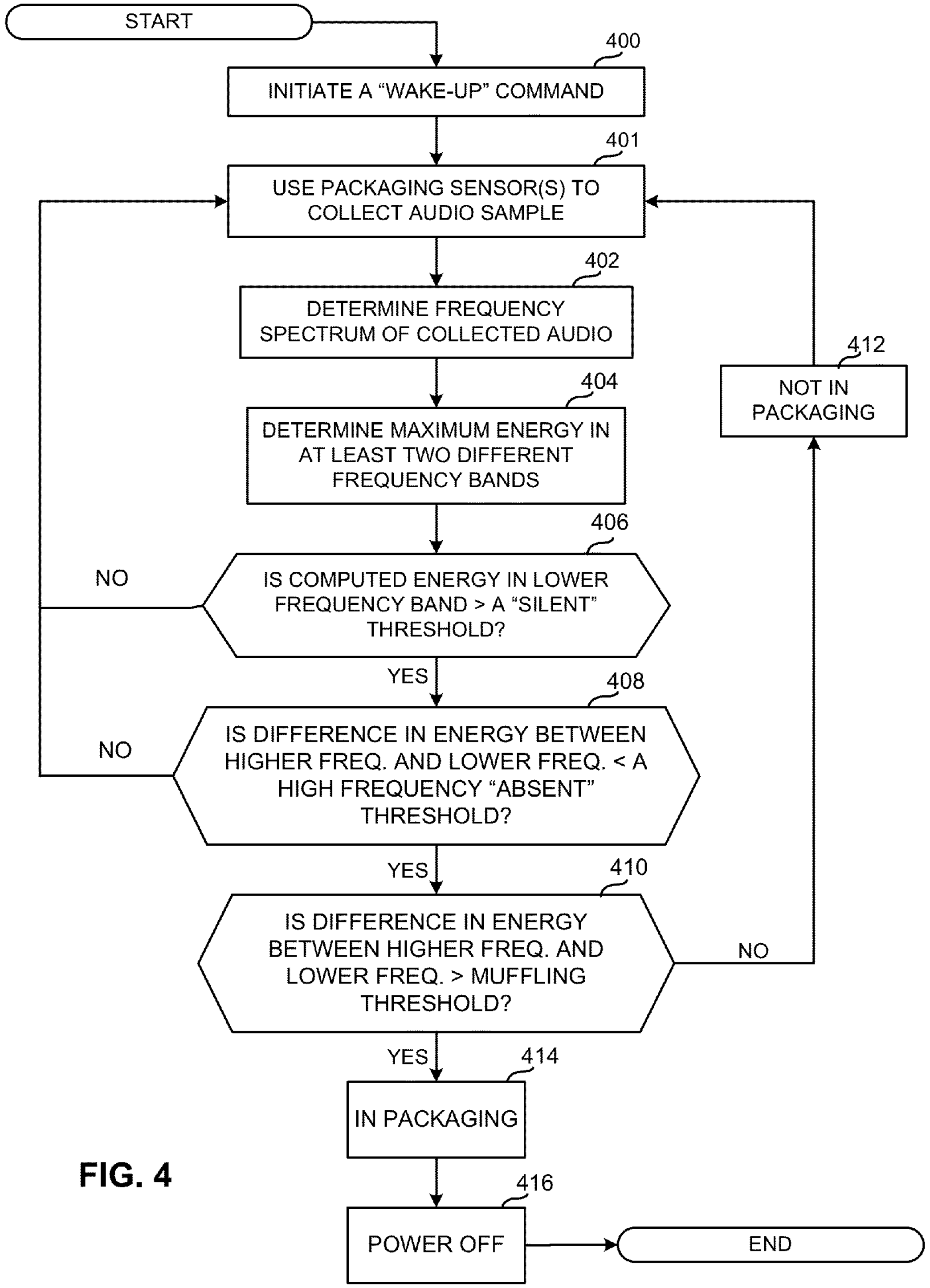
FIG. 4 is a flow diagram representative of example machine readable instructions that may be executed to implement the example metering device of FIG. 2 to collect media exposure information and to determine whether the metering device should be powered down.

The flow diagram of FIG. 4 is representative of machine readable instructions that can be executed on a particular machine to implement the example methods, apparatus, systems, and/or articles of manufacture described herein. In particular, FIG. 4 depicts a flow diagram representative of machine readable instructions that may be executed to implement the example metering device 108 of FIGS. 1, 2, and/or 3 to collect audio information to determine whether the metering device 108 is in the package 125, and to power off the metering device 108 when it is determined that the device is packaged. The example instructions of FIG. 4 may be performed using a processor, a controller and/or any other suitable processing device. For example, the example instructions of FIG. 4 may be implemented in coded instructions stored on a tangible medium such as a flash memory, a read-only memory (ROM) and/or random-access memory (RAM) associated with a processor (e.g., the example processor 512 discussed below in connection with FIG. 5). Alternatively, some or all of the example instructions of FIG. 4 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example instructions of FIG. 4 may be implemented manually or as any combination(s) of any of the foregoing techniques, for example, any combination of firmware, software, discrete logic and/or hardware. Further, although the example instructions of FIG. 4 are described with reference to the flow diagram of FIG. 4, other methods of implementing the instructions of FIG. 4 may be employed. For example, the order of execution of the blocks may be changed, and/or some of the blocks described may be changed, eliminated, sub-divided, or combined. Additionally, any or all of the example instructions of FIG. 4 may be performed sequentially and/or in parallel by, for example, separate processing threads, processors, devices, discrete logic, circuits, etc.

In the example of FIG. 4, the methodology for collecting the media exposure data is not shown. However, it will be understood that media exposure data is being substantially constantly collected (if available) and time stamped when the device is powered on. Thus, the exposure data may be collected in parallel with the execution of the instructions of FIG. 4. Thus, for example, the media exposure data may be collected using any desired technique by a parallel thread or the like.

Turning to FIG. 4, the metering device 108 initiates a "wake-up" command to power on the device 108 if necessary (block 400). For example, the metering device 108 may be powered on at a predetermined time (i.e., a "wake-up" time) stored in the real-time clock 214 and/or stored in the memory 208 and based on a comparison of the predetermined time to the time of the real-time clock 214. The "wake-up" command may be initialized upon activation of the device 108 (e.g., upon completion of manufacturing) and therefore, the device 108 may be considered substantially always awake. Once powered on, the packaging sensor 210 collects an input reflecting the ambient noise 300 surrounding the metering device 108 (block 401). In the illustrated example, the ambient noise is received by the audio sensor 210A for a substantially continuous time frame, such as, for example, a 15 minute period of time. The characteristics of the received ambient noise 300 are used to determine the location of the metering device 108 relative to the package 125.

For example, the packaging detector 212 determines the frequency spectrum of the received ambient noise 300 by, for instance, passing the audio signal through a Fast Fourier Transform (FFT) (block 402). The maximum energy associated with two different frequency bands are then determined (block 404). In this example, the example packaging detector 212 calculates the maximum energy in a higher frequency band such as, for example, 2400 Hz and a lower frequency band such as, for example 600 Hz. The particular frequency bands utilized by the packaging detector 212 may be selected based upon, for example, the characteristics of the package 125. For example, the package 125 may be constructed of a particular material that especially muffles a first frequency band (e.g. a higher frequency), while not especially muffling a second frequency band (e.g. a lower frequency). Additionally, the packaging detector 212 may discard outlying maximum energy readings that are likely to be caused by percussive events (block 404), such as, for instance, a dropped package, a loud noise proximate the meter, etc.

After the maximum energy levels of the particular frequencies of the detected ambient noise 300 are determined (block 404), the energy levels are compared to specific thresholds (blocks 406, 408, and 410). As noted above, the thresholds may be determined by any suitable method, including, for instance, previous samplings, statistical analysis of multiple samples, previous readings, known acoustical characteristics of the package 125, and/or any other determination method. For example, the packaging detector 212 of the illustrated example compares the results of the measured energy level of the lower of the measured frequencies (e.g., around 600 Hz) to a first threshold (e.g., a "silent" threshold") (block 406). This comparison ensures that an evaluation of whether the device 108 is within the package 125 does not occur during times of silence, such as, for example, during the evening hours when the panelist's residence is quiet. If it is determined that the energy level of the lower frequency is not above the first threshold, process control returns to block 401, to retrieve the next audio sample (block 401).

If, however, it is determined that the energy level of the lower frequency is greater than the first threshold, then the difference between the higher frequency (e.g., 2400 Hz) and the lower frequency (e.g., 600 Hz) is compared to a second threshold (block 408) to ensure that the captured ambient noise 300 contains sufficient data in the higher frequency band to make a determination of whether the package is within the package 125, because sound muffling typically occurs in the higher frequencies. If the difference is not less than the second threshold, the process control returns to block 401, to retrieve the next audio sample (block 401). If the data is sufficient to make an evaluation of whether the device 108 is within the package 125, the difference between the energy associated with a higher frequency and the energy associated with a lower frequency is compared to a third threshold (block 410). By comparing the difference between the frequencies to the third threshold, the packaging detector 212 can determine that the meter 108 is or is not located within the package 125.

Specifically, if the difference between the energy level of the frequencies is less than the third threshold (block 410) the packaging detector 212 determines that the metering device 108 is not located within the packaging 125 (block 412). Process control then returns to block 401, to retrieve the next audio sample (block 401).

If, however, the difference between the energy level of the frequencies is greater than the third threshold (block 410), the packaging detector 212 determines that the metering device 108 is located within the packaging 125 (block 414). In this example, the packaging detector 212 initiates a powering off of the metering device 108 (block 416). As described above, while in some instances, the power off mode may completely shut down power to all elements of the metering device 108, in this example, a power off mode includes a powering down of all elements except for the example real-time clock 214 and the memory 208 to facilitate periodic testing of the packaging status.

Figure 5:
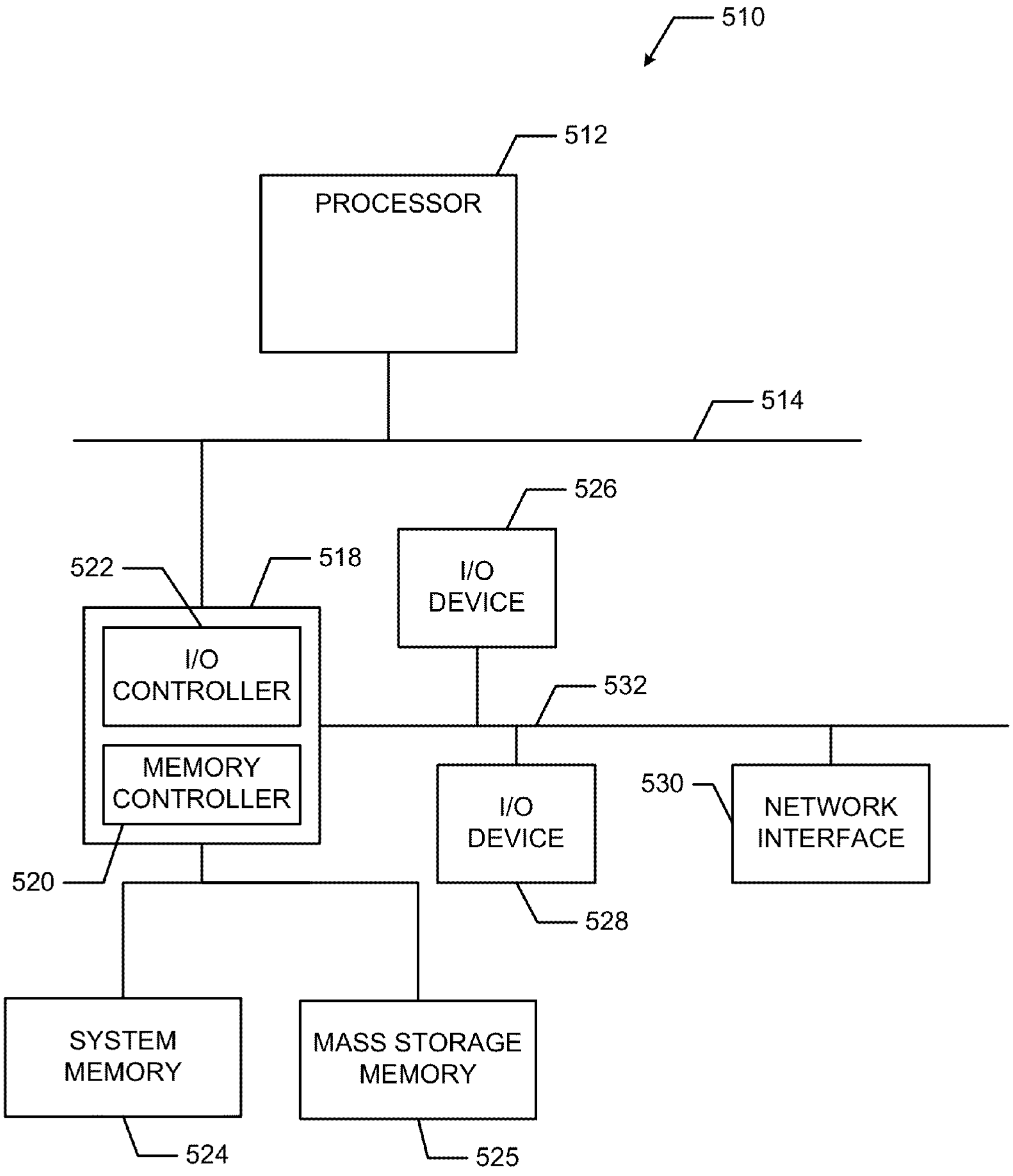
FIG. 5 is a block diagram of an example processor system that may be used to execute the machine readable instructions of FIG. 4 to implement the example metering device of FIG. 2.

FIG. 5 is a block diagram of an example processor system 510 that may be used to execute the instructions of FIG. 4 to implement the example metering device 108 of FIG. 2. As shown in FIG. 5, the processor system 510 includes a processor 512 that is coupled to an interconnection bus 514. The processor 512 may be any suitable processor, processing unit or microprocessor. Although not shown in FIG. 5, the system 510 may be a multi-processor system and, thus, may include one or more additional processors that are different, identical or similar to the processor 512 and that are communicatively coupled to the interconnection bus 514.

The processor 512 of FIG. 5 is coupled to a chipset 518, which includes a memory controller 520 and an input/output (I/O) controller 522. The chipset 518 provides I/O and memory management functions as well as a plurality of general purpose and/or special purpose registers, timers, etc. that are accessible or used by one or more processors coupled to the chipset 518. The memory controller 520 performs functions that enable the processor 512 (or processors if there are multiple processors) to access a system memory 524 and a mass storage memory 525.

The system memory 524 may include any desired type of volatile and/or non-volatile memory such as, for example, static random access memory (SRAM), dynamic random access memory (DRAM), flash memory, read-only memory (ROM), etc. The mass storage memory 525 may include any desired type of mass storage device including hard disk drives, optical drives, tape storage devices, etc.

The I/O controller 522 performs functions that enable the processor 512 to communicate with peripheral input/output (I/O) devices 526 and 528 and a network interface 530 via an I/O bus 532. The I/O devices 526 and 528 may be any desired type of I/O device such as, for example, a keyboard, a video display or monitor, a mouse, etc. The network interface 530 may be, for example, an Ethernet device, an asynchronous transfer mode (ATM) device, an 802.11 device, a DSL modem, a cable modem, a cellular modem, etc. that enables the processor system 510 to communicate with another processor system.

While the memory controller 520 and the I/O controller 522 are depicted in FIG. 5 as separate blocks within the chipset 518, the functions performed by these blocks may be integrated within a single semiconductor circuit or may be implemented using two or more separate integrated circuits.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A method of operating a media detector, comprising:
placing a media detector in a shipping power mode in which the media detector is at least partially powered down;
collecting audio data at the media detector;
comparing a first threshold to a difference between a first characteristic of the audio data at a first frequency and a second characteristic of the audio data at a second frequency;
determining whether the comparison of the first threshold and the difference indicates that the media detector is likely in a package; and
maintaining the media detector in the shipping power mode when the comparison indicates that the media detector is likely in the package.

2. A method as defined in claim 1, further comprising taking the media detector out of the shipping power mode when the comparison indicates that the media detector is likely outside the package.

3. A method as defined in claim 1, further comprising selecting one or more of the first and second frequencies based on a material of the package.

4. A method as defined in claim 1, wherein the collection of the audio data is performed in response to issuance of a wake-up command while the media detector is in the shipping power mode.

5. A method as defined in claim 4, wherein the issuance is based on a periodic schedule.

6. A method as defined in claim 1, further comprising removing data corresponding to percussive events from the collected audio data before the comparing of the first threshold and the difference.

7. A method as defined in claim 1, further comprising comparing a second threshold to the difference between the first characteristic of the audio data at the first frequency and the second characteristic of the audio data at the second frequency, wherein the second threshold corresponds to an amount of data considered to be sufficient for the comparison of the first threshold and the difference to be valid.

8. A method as defined in claim 1, wherein the first and second characteristics are energy levels.

9. A tangible machine readable storage device comprising instructions that, when executed, cause a machine to at least:
place a media detector in a shipping power mode in which the media detector is at least partially powered down;
collect audio data at the media detector;
compare a first threshold to a difference between a first characteristic of the audio data at a first frequency and a second characteristic of the audio data at a second frequency;
determine whether the comparison of the first threshold and the difference indicates that the media detector is likely in a package; and
maintain the media detector in the shipping power mode when the comparison indicates that the media detector is likely in the package.

10. A tangible machine readable storage device as defined in claim 9, the instructions to cause the machine to take the media detector out of the shipping power mode when the comparison indicates that the media detector is likely outside the package.

11. A tangible machine readable storage device as defined in claim 9, wherein one or more of the first and second frequencies are selected based on a material of the package.

12. A tangible machine readable storage device as defined in claim 9, the instructions to cause the machine to perform the collection of the audio data in response to issuance of a wake-up command while the media detector is in the shipping power mode.

13. A tangible machine readable storage device as defined in claim 12, wherein the issuance is based on a periodic schedule.

14. A tangible machine readable storage device as defined in claim 9, the instructions to cause the machine to remove data corresponding to percussive events from the collected audio data before the comparing of the first threshold and the difference.

15. A tangible machine readable storage device as defined in claim 9, the instructions to cause the machine to compare a second threshold to the difference between the first characteristic of the audio data at the first frequency and the second characteristic of the audio data at the second frequency, wherein the second threshold corresponds to an amount of data considered to be sufficient for the comparison of the first threshold and the difference to be valid.

16. A tangible machine readable storage device as defined in claim 9, wherein the first and second characteristics are energy levels.

17. An apparatus, comprising:
- a media detector to collect information for identification of media to which the apparatus is exposed;
- a memory to store the information collected by the media detector; and
- a packaging detector to:
  - collect audio data;
  - compare a first threshold to a difference between a first characteristic of the audio data at a first frequency and a second characteristic of the audio data at a second frequency; and
  - when the comparison of the first threshold and the difference indicates that the apparatus is likely in a package, power down the media detector and maintain power to the memory.

18. An apparatus as defined in claim 17, wherein the packaging detector is to, when the comparison of the first threshold and the difference indicates that the apparatus is likely outside of the package, power on the media detector.

19. An apparatus as defined in claim 17, wherein one or more of the first and second frequencies are selected based on a material of the package.

20. An apparatus as defined in claim 17, wherein the packaging detector is to remove data corresponding to percussive events from the collected audio data before the comparing of the first threshold and the difference.

* * * * *